US012653346B1

(12) United States Patent
Douglas

(10) Patent No.: US 12,653,346 B1
(45) Date of Patent: Jun. 16, 2026

(54) RETRACTABLE CUTTING BOARD

(71) Applicant: James C. Douglas, Plano, TX (US)

(72) Inventor: James C. Douglas, Plano, TX (US)

( * ) Notice: Subject to any disclaimer, the term of this patent is extended or adjusted under 35 U.S.C. 154(b) by 377 days.

(21) Appl. No.: 18/383,710

(22) Filed: Oct. 25, 2023

Related U.S. Application Data

(60) Provisional application No. 63/505,730, filed on Jun. 2, 2023.

(51) Int. Cl.
*A47J 47/00* (2006.01)

(52) U.S. Cl.
CPC ................................... *A47J 47/005* (2013.01)

(58) Field of Classification Search
CPC ........... A47J 47/005; A47J 47/00; A47J 47/14
See application file for complete search history.

(56) References Cited

U.S. PATENT DOCUMENTS

| | | | | |
|---|---|---|---|---|
| 5,363,755 | A * | 11/1994 | Liang | A47B 47/005 |
| | | | | 99/352 |
| 5,386,978 | A | 2/1995 | Ladwig | |
| 6,889,969 | B2 * | 5/2005 | Diermeier | A47J 47/005 |
| | | | | 269/289 R |

| | | | | |
|---|---|---|---|---|
| 8,286,956 | B2 | 10/2012 | Pearl | |
| 9,687,113 | B2 * | 6/2017 | Torlai | A47J 47/005 |
| 11,019,964 | B1 * | 6/2021 | Prepon | A47J 47/005 |
| 11,889,953 | B2 | 2/2024 | Charles | |
| 2007/0001359 | A1 * | 1/2007 | Pearl | A47J 47/005 |
| | | | | 269/289 R |
| 2009/0260168 | A1 * | 10/2009 | Zeitlin | A47J 47/005 |
| | | | | 15/236.01 |
| 2012/0153554 | A1 * | 6/2012 | Ito | A47J 47/005 |
| | | | | 269/289 R |
| 2014/0138893 | A1 * | 5/2014 | Khuu | A47J 47/005 |
| | | | | 269/289 R |
| 2019/0380543 | A1 * | 12/2019 | Bhargava | A47J 47/005 |
| 2022/0039605 | A1 * | 2/2022 | Charles | A47J 47/005 |

FOREIGN PATENT DOCUMENTS

EP 3829404 B1 6/2023

* cited by examiner

*Primary Examiner* — Seahee Hong
(74) *Attorney, Agent, or Firm* — Richard Eldredge; Leavitt Eldredge Law Firm

(57) ABSTRACT

A retractable cutting board for processing foods such as cutting, and for keeping hands and fingers safely away from the knife's cutting edge, comprising a main body, one or more retractable flaps, a plurality of legs, a scraper, a plurality of bumpers, a plurality of receptacles, and an appending board surface member. The retractable flap serves as a protective device for hands and fingers that holds down food to be processed onto the said upper surface of the main body, and is retracted into the main body when not in use.

1 Claim, 4 Drawing Sheets

RETRACTABLE CUTTING BOARD

CROSS-REFERENCE TO RELATED APPLICATIONS

This application is a continuation of U.S. Provisional Application No. 63/505,730 filed on Jun. 2, 2023, which is hereby incorporated by reference in its entirety.

BACKGROUND

1. Field of the Invention

The present application relates to a cutting board, and more particularly to a retractable cutting board for processing foods such as cutting, and for keeping hands and fingers safely away from the knife's cutting edge.

2. Description of Related Art

The art of preparing food is as necessary as it has been with humans from the beginning. The advent of modern prepared food has only recently begun to affect society, and many food items still require a certain amount of processing by hand. Meats, vegetables, and fruits will often require cutting. Cutting means the food item must be maneuvered by hand to apply a sharp knife or blade to slice the food item for portions in addition to fruits and vegetables that require cutting to remove or expose the edible portions. Using a knife requires a certain amount of skill, as the instrument can be quite dangerous to the person using the blade. Cutting a food item with a knife requires that one hand holds the item steady while the other wields the knife. Knives don't care what they cut, so hands and fingers are just as susceptible to slicing as any other cutting board item. The user must take utmost care to avoid injury using a sharp knife when cutting food items on a cutting board.

Cutting boards have served as a cornerstone in food preparation ever since the stone age. Although materials have changed to include not only wood or stone, but polymer, glass, and aluminum; The general purpose of the cutting board remains the same. The cutting board has been used as a sturdy base for cleaning and cutting meats, fruits, and vegetables, and an all-around food preparation wonder included in nearly every kitchen on the globe today.

Often, the existing cutting boards are difficult to use, and remove the cut debris and the liquids from the debris puddle up on the cutting boards causing inconvenience to the user. Common cutting boards lack usability in areas such as storage, cleanliness, and sturdiness. Because of their basic flat design, most cutting boards have no available space for storing cuttings or pre-prep. They can also be difficult to keep clean during use which may pose a problem when cutting, or other waste piles up. Sturdiness, and slipping can also present problems while trying to process foods, and working with an un-sturdy cutting board can lead to serious injuries.

Although great strides have been made in the area of cutting boards, many shortcomings remain.

BRIEF DESCRIPTION OF THE DRAWINGS

The appended claims set forth the novel features believed characteristic of the embodiments of the present application. However, the application itself, as well as a preferred mode of use, and further objectives and advantages thereof, will best be understood by reference to the following detailed description when read in conjunction with the accompanying drawings, wherein:

Figure 1:
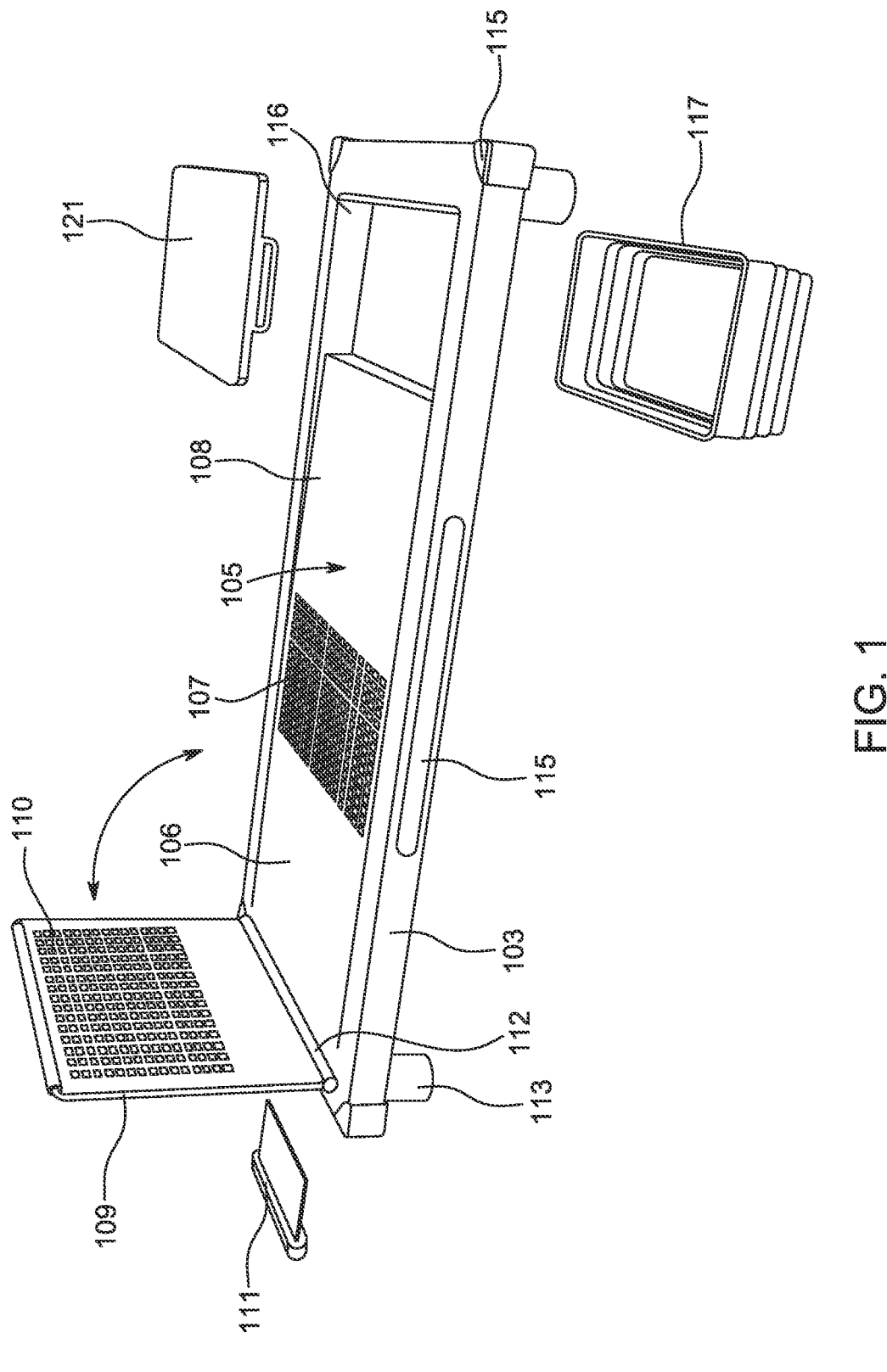
FIG. 1 is an exploded perspective view of the retractable cutting board according to an embodiment of the present application.

While the application is susceptible to various modifications and alternative forms, specific embodiments thereof have been shown by way of example in the drawings and are herein described in detail. It should be understood, however, that the description herein of specific embodiments is not intended to limit the application to the particular forms disclosed, on the contrary, the intention is to cover all modifications, equivalents, and alternatives falling within the spirit and scope of the application as described herein.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method will be understood, both as to its structure and operation, from the accompanying drawings, taken in conjunction with the accompanying description. Several embodiments of the retractable cutting board may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments are expressly contemplated herein so that one of ordinary skill in the art would appreciate from this disclosure that the features, elements, and/or functions of one embodiment may be incorporated into another embodiment as appropriate unless otherwise described.

Referring now to the Figures wherein reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

The retractable cutting board 100 of the present application is configured to provide a scraper that is stored at one end of the board where it is easily retrieved and replaced. The surface of the retractable cutting board is engineered with a slight slope allowing liquids and other debris cuttings to be easily scraped into a unique receptacle inserted into the board. The receptacle is collapsible and can be easily removed for emptying. A sturdy lid that fits neatly on the collapsible receptacle while either in place on the board or when removed is included. Rubber feet hold the retractable cutting board securely when used, and rubber bumpers are also located on the corners and in various other places on the board for added user safety. The retractable cutting board features many outstanding innovations, including the retractable flap that serves as a protective device that holds down meat, poultry, fish, fruit, vegetables, etc. The flap is food safe and durable while providing extra safety. The flap will retract out of the way and into the board's body when not needed.

Being produced with polymers allows the retractable cutting board a range of cost-efficient manufacturing processes. Injection molding, thermoforming, and vacuum forming are all viable manufacturing techniques capable of producing high-quality products in short time frames and at the most efficient costs. Manufacturing facilities are located worldwide, meaning logistics and storage options are exponential. The retractable cutting board is produced of high-quality and food-grade polymers. Hinges and fasteners are sourced from reputable manufacturers and all assembly is completed with industrial adhesives as necessary. The retractable cutting board has been engineered and manufactured for repeated use over many years.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein reference characters identify corresponding or similar elements throughout the several views, FIGS. 1-5 depict different views of a retractable cutting board 100 in accordance with the present invention. In addition, it should be appreciated that more or fewer such components may be included in different embodiments of the retractable cutting board 100.

In the contemplated embodiment, the retractable cutting board 100 includes a flat, horizontal main body 103 for the use of food processing such as cutting. The main body 103 includes an upper surface 105 for cutting. The upper surface 105 is sloped downward relative to that of a perimeter of the main body 103 so as to induce a gravitational clearing effect upon particles and liquids contacting the upper surface 105. The upper surface 105 includes an area of non-slip surface treatment 107. The non-slip surface treatment 107 can cover any portions of the upper surface 105. The upper surface 105 may therefore designate an upper end 106 and a lower end 108. The upper end 106 is upstream, or higher than the lower end 108. Surface treatment 107 may be used as a delineator between both ends 106 and 108.

In the contemplated embodiment, the retractable cutting board 100 is also equipped with a sliding and retractable flap 109 used to safely assist in cutting operations. In conjunction with the non-slip surface 107, the retractable flap acts in place of a user's hand to hold meat for cutting. Non-skid elements are placed on the underside of the flap to give the flap a safe and secure grip on the food items. The retractable flap 109 has a surface treatment of a non-slip surface 110, which may feature non-skid elements to keep any slippery or wet items from moving accidentally, similar to surface treatment 107. The flap is used to press and hold food while being sliced, keeping hands and fingers safely away from the knife's cutting edge.

The retractable flap 109 is secured to body 103 via high-density polymer or corrosive-free alloy hinges 112. These may have the characteristics of permitting more than 270 degrees of rotation and be strong enough to withstand the pressures applied by a user onto any food underneath it.

Figure 2:
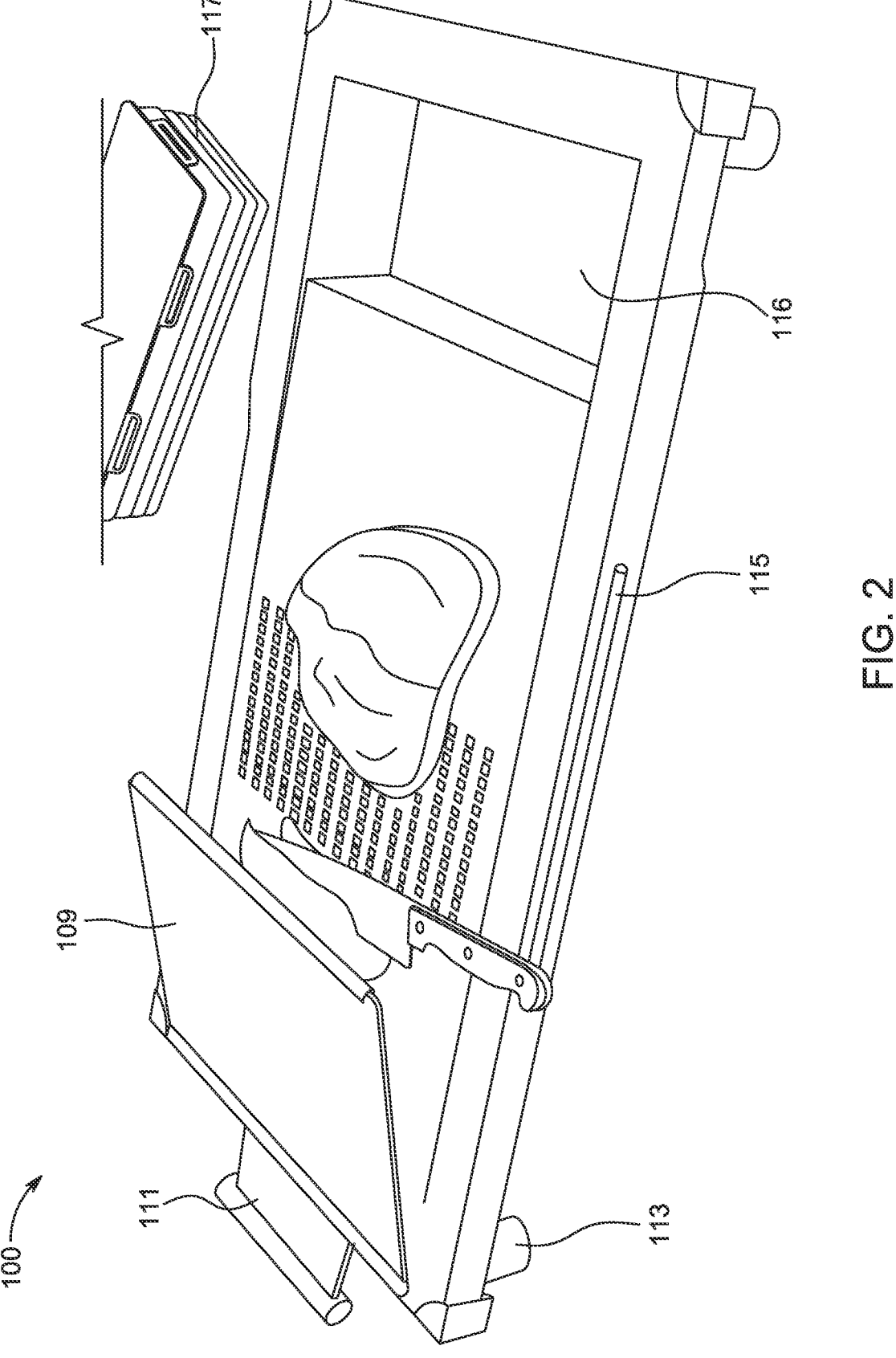
FIG. 2 is a perspective view of a retractable cutting board of FIG. 1 in use.

In the contemplated embodiment, the retractable cutting board 100, as shown in FIG. 2, food preparations may be located on the upper surface 105 of the retractable cutting board 100 and secured for preparation by a user. One or more retractable flaps 109 may be used to secure the food. The retractable cutting board 100 is configured to permit easy run-off of liquids and small particles along its upper surface. A slight slope is used to angle food particles and liquids into a storage location or cavity.

In operation, users place meat or other food products that need to be cut under the retractable flap 109, applying a light force to secure the product in between the surfaces 107 and 110. This creates a stable environment for cutting and slicing while reducing injury risks. When the user is finished with the flap, it can be safely retracted into the board, ready for use instantly whenever needed. It is understood that treatments 107 and 110 may include raised or lowered portions to increase grip and facilitate runoff as food preparations may be elevated partially off surface 105.

The retractable cutting board 100 also includes a retractable scraper 111 configured to aid in scraping surface 105 to aid in the cleaning or removal of debris from the food preparations. Scraper 111 may be removably inserted into a slot in body 103 and selectively removable when needed. It may be cleaned independently of body 103. The scraper 111 has a large rubber handle and is easily accessed at any time by simply pulling the handle from the storage place on the board.

The main body 103 is supported by one or more feet 113, configured to elevate body 103 above an operative surface. The feet may include a surface treatment such as non-skid. The height or length of the feet is ideally uniform; however, the height may be made so as to differentiate one end of body 103 from the other end. Differentiated lengths of feet 113 may influence the slope of the upper surface 105. The perimeter of body 103 may also include a plurality of bumper 115 configured to protect body 103 and also allow for stable storage on its side. The bumpers may also receive a surface treatment similar to that described herein.

Figure 3:
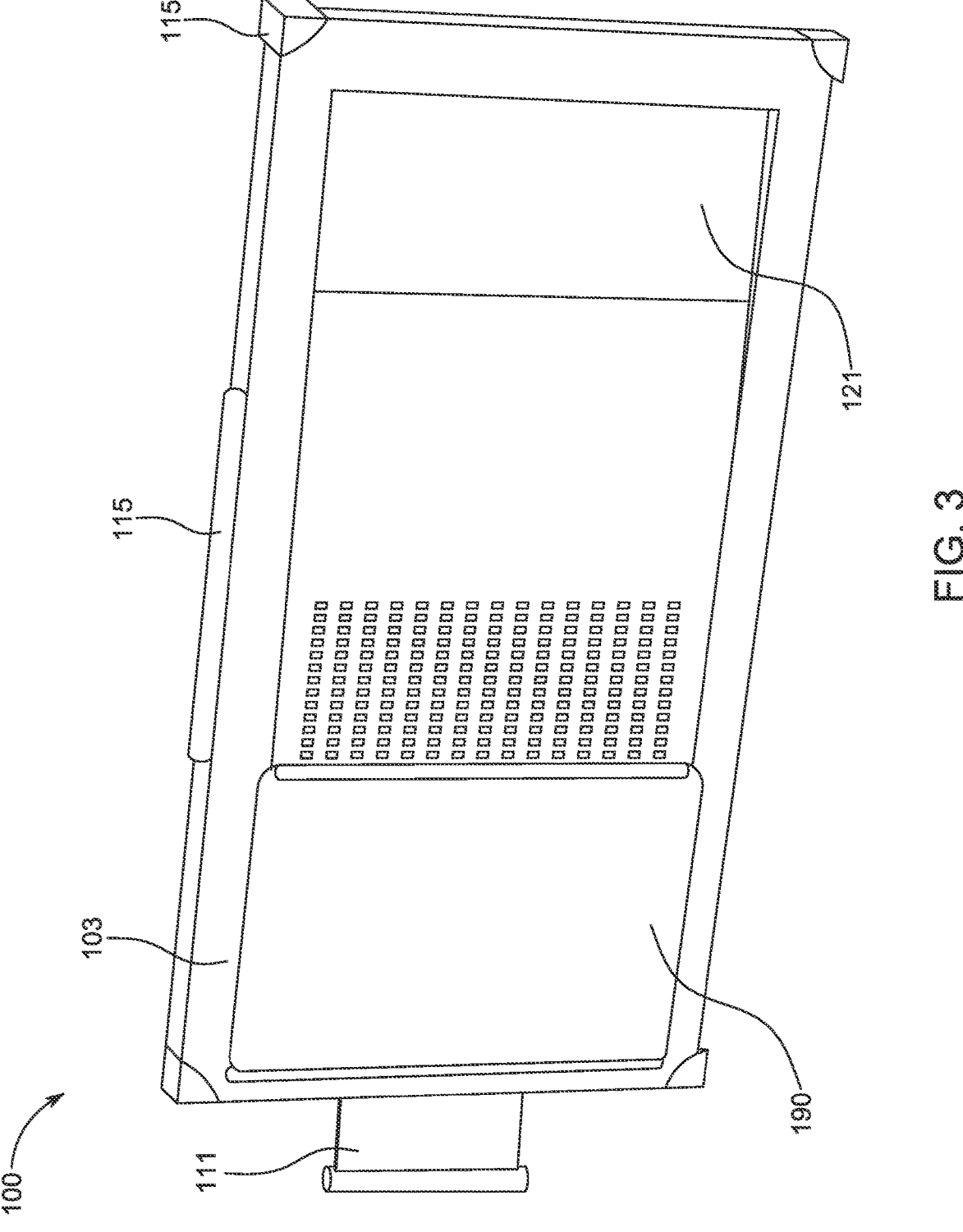
FIG. 3 is a front-side perspective view of the retractable cutting board of FIG. 1 in a stored configuration.

In particular with FIG. 3, a stored or collapsed configuration is shown wherein the retractable flap 109 is fully lowered to surface 105. Scraper 111 is adjacent to its storage location. Surface 105 is cleaned and a clearer view of body 103 and bumpers 115.

Figure 5:
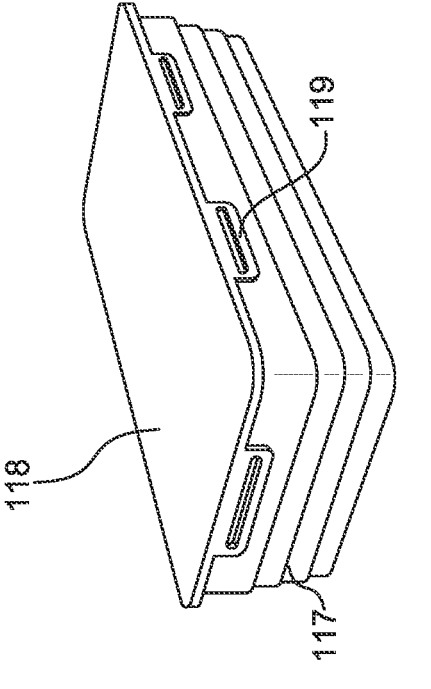
FIG. 5 is a perspective view of a receptacle in an extended configuration, to be used with the retractable cutting board of FIG. 1.
Figure 4:
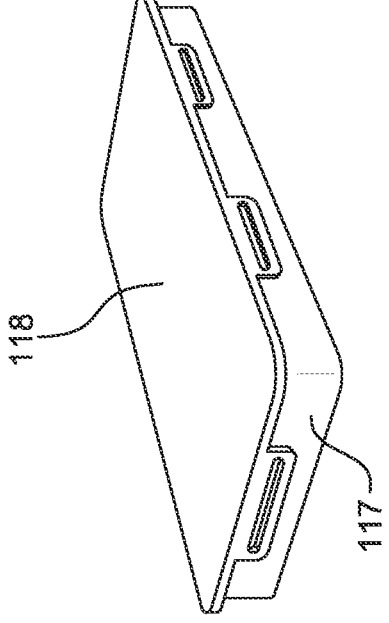
FIG. 4 is a perspective view of a receptacle in a collapsed configuration, to be used with the retractable cutting board of FIG. 1.

As seen in particular with FIG. 1 and referring now also to FIGS. 4-5, the main body 103 may include an aperture 116 or pass through from the upper surface 105 all within the perimeter of body 103. The aperture 116 is to allow for the collection of the discarding of scraps, liquids, and general debris from food preparation. A receptacle 117 may be included to collect such discardings or food cuttings. The receptacle 117 may selectively couple to or be located beneath the aperture 116. The receptacle 117 can be removed by the user from the board for emptying or for storage of food products or other implementations. The receptacle 117 is also collapsible and features a lid to enable the receptacle to be used as storage for food or implements. When finished, the receptacle 117 folds neatly into itself.

As seen in FIGS. 4-5, receptacle 117 may be collapsible in that it may telescopically shorten or lengthen in height by translating within itself. This allows a user to select the amount of space needed within receptacle 117 to more efficiently store its contents. FIG. 4 shows a collapsed configuration and FIG. 5 shows an extended configuration of the receptacle 117. A collapsible receptacle is not necessary but is a convenient feature, receptacle 117 may include a lid 118 that secures via one or more attachment locations 119 around its perimeter.

The retractable cutting board 100 can further include an appending board surface member 121, as shown in FIG. 1. The appending board surface member 121 can be used to cover aperture 116 to increase usable workspace at surface 105 and also to close off aperture 105 from debris. It is removable and may serve as a remote cutting surface to increase food preparation efficiency especially where multiple users may be working together.

The retractable cutting board 100 can be made from one or more suitable materials including but not limited to polymers or blends of plastic, rubber, metal, wood, etc.

It should be appreciated that the retractable cutting board 100 is intended to be both practical and functional. The manufacturer's marketability is enhanced by the relative simplicity of manufacturing and reasonably priced components. Improved aesthetics and ease of use benefit the user, which should generate significant market interest in the product. It is a comprehensive food processing product with convenient features that increases the individual's safety. The retractable cutting board can prove to be invaluable to anyone using knives and cutting food for cooking and consumption and is configured to minimize the transmission of unwanted diseases or germs.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms but is amenable to various changes and modifications without departing from the spirit thereof.

What is claimed is:

1. A retractable cutting board for processing foods such as cutting, and for keeping hands and fingers safely away from knife's cutting edge, comprising:

a main body having:
an upper surface for processing foods; and
an aperture;
one or more retractable flaps;
a plurality of legs;
a scraper;
a plurality of bumpers;
a plurality of receptacles;
an appending board surface member;
wherein the upper surface of the main body is sloped downward relative to that of a perimeter of the main body allowing liquids and food cuttings to be easily scraped into the receptacle;
wherein each of the retractable flaps is slidably and rotatably secured to the main body and serves as a protective device for the hands and the fingers that holds down food to be processed onto the upper surface of the main body, and is retracted into the main body when not in use;
wherein the plurality of legs securely raises the main body above kitchen platform;
wherein the scraper is removably inserted into a slot in the main body selectively retrieved for scraping the food cuttings into the aperture or the receptacle;
wherein the plurality of bumpers is located at corners and sides of the main body for safety;
wherein each of the plurality of receptacles is configured to be collapsible or extendable and is removably inserted into the aperture of the main body to collect the food cuttings, and can be closed with a lid snugly fit onto the receptacle;
wherein the retractable cutting board is having a non-slip surface;
wherein the appending board surface member covers the aperture from the food cuttings to increase the usable workspace of the retractable cutting board.

* * * * *